United States Patent
Abrams et al.

(10) Patent No.: US 12,460,931 B2
(45) Date of Patent: Nov. 4, 2025

(54) MITIGATING BIAS INSTABILITIES IN OPTICAL GYROSCOPES

(71) Applicant: Anello Photonics, Inc., Santa Clara, CA (US)

(72) Inventors: Nathan Abrams, Santa Clara, CA (US); Mario Paniccia, Santa Clara, CA (US); Mike Horton, Santa Clara, CA (US)

(73) Assignee: Anello Photonics, Inc., Santa Clara, CA (US)

(*) Notice: Subject to any disclaimer, the term of this patent is extended or adjusted under 35 U.S.C. 154(b) by 0 days.

(21) Appl. No.: 18/885,420

(22) Filed: Sep. 13, 2024

(65) Prior Publication Data
US 2025/0003751 A1    Jan. 2, 2025

Related U.S. Application Data

(63) Continuation of application No. 18/626,209, filed on Apr. 3, 2024, now Pat. No. 12,123,718.
(Continued)

(51) Int. Cl.
*G01C 19/72* (2006.01)
*G01C 19/10* (2006.01)
(Continued)

(52) U.S. Cl.
CPC ........... *G01C 19/661* (2013.01); *G01C 19/10* (2013.01); *G01C 19/64* (2013.01); *G01C 19/72* (2013.01); *G01C 19/725* (2013.01)

(58) Field of Classification Search
CPC ...... G01C 19/661; G01C 19/10; G01C 19/64; G01C 19/72; G01C 19/725
See application file for complete search history.

(56) References Cited

U.S. PATENT DOCUMENTS 4,707,136 A * 11/1987 Kim .................... G01C 19/726
                                                    356/464
5,056,919 A * 10/1991 Arditty ................ G01C 19/726
                                                    356/464
(Continued)

OTHER PUBLICATIONS

International Search Report and Written Opinion for International Application No. PCT/US2024/023084, mailed Aug. 27, 2024, 16 Pages.
(Continued)

*Primary Examiner* — Jonathan M Hansen
(74) *Attorney, Agent, or Firm* — Lowenstein Sandler LLP; Madhumita Datta (57) ABSTRACT

One or more phase modulators in an optical gyroscope operate on two counter-propagating beams to introduce a phase shift between the beams before the beams are interferometrically combined to generate a rotation signal. A signal generator generates first and second modulation frequencies to drive the phase modulators. The first modulation frequency in isolation biases the rotation signal at an operating point sensitive to rotation, and the second modulation frequency in isolation biases the rotation signal at an operating point insensitive to rotation. One or more control integrated circuits (ICs) isolate a first portion of the rotation signal associated with the first modulation frequency and a second portion of the rotation signal associated with the second modulation frequency. The control ICs determine a difference between the first and second portions of the rotation signal to remove one or more bias instabilities from the first portion of the rotation signal.

10 Claims, 7 Drawing Sheets

Related U.S. Application Data (60) Provisional application No. 63/495,513, filed on Apr. 11, 2023.

(51) Int. Cl.
*G01C 19/64* (2006.01)
*G01C 19/66* (2006.01)

(56) References Cited

U.S. PATENT DOCUMENTS

| | | | | |
|---|---|---|---|---|
| 5,262,843 | A * | 11/1993 | Sugarbaker | G01C 19/72 356/464 |
| 5,552,887 | A * | 9/1996 | Dyott | G01C 19/722 356/465 |
| 10,180,325 | B2 * | 1/2019 | Bowers | G01C 19/66 |
| 10,731,988 | B1 * | 8/2020 | Paniccia | G01C 19/727 |
| 10,969,548 | B2 | 4/2021 | Paniccia et al. | |
| 11,187,532 | B2 | 11/2021 | Paniccia et al. | |
| 2008/0079947 | A1 * | 4/2008 | Sanders | G01C 19/727 356/461 |
| 2011/0037985 | A1 | 2/2011 | Qiu et al. | |
| 2013/0107271 | A1 * | 5/2013 | Strandjord | G01C 19/727 356/461 |
| 2015/0009505 | A1 * | 1/2015 | Lefevre | G01C 19/726 356/460 |
| 2017/0199037 | A1 * | 7/2017 | Jain | G02B 6/29347 |
| 2017/0307375 | A1 * | 10/2017 | Bowers | G01C 19/66 |
| 2018/0274926 | A1 | 9/2018 | Wang | |
| 2021/0010811 | A1 * | 1/2021 | Paniccia | G01C 19/727 |
| 2021/0140768 | A1 * | 5/2021 | Paniccia | G01C 19/72 |
| 2022/0011111 | A1 * | 1/2022 | Paniccia | G01C 19/661 |
| 2022/0136831 | A1 | 5/2022 | Paniccia | |
| 2022/0260373 | A1 | 8/2022 | Paniccia et al. | |
| 2024/0328783 | A1 * | 10/2024 | Wu | H01S 3/0071 |

OTHER PUBLICATIONS

Hao Tian et al., "Hybrid integrated photonics using bulk acoustic resonators", Nat Commun 11, 3073, https://doi.org/10.1038/s41467-020-16812-6, 2020, pp. 1-8.

* cited by examiner

MITIGATING BIAS INSTABILITIES IN OPTICAL GYROSCOPES

RELATED APPLICATIONS

This application is a continuation of and claims the benefit of U.S. patent application Ser. No. 18/626,209, filed Apr. 3, 2024, titled "Mitigating Bias Instabilities In Optical Gyroscopes," which claims the benefit of U.S. Provisional Patent Application No. 63/495,513, filed Apr. 11, 2023, titled "Mitigating Bias Instabilities In Optical Gyroscopes," the entirety of which is incorporated herein by reference.

TECHNICAL FIELD

The present disclosure relates to optical gyroscopes, and more specifically, to systems and methods for reducing gyroscope bias instability without reducing sensitivity to rotation.

BACKGROUND

Gyroscopes enable measurement of rotational motion (e.g., angular velocity) in one or more physical dimensions. Gyroscopes may be based on mechanical (e.g., including MEMS), optical, or other modes of operation, and may vary in performance, ruggedness, cost, size, and other parameters. Gyroscope applications include military and defense, aircraft navigation, robotics, autonomous vehicles, virtual and augmented reality, gaming, and others.

Some gyroscopes (e.g., optical gyroscopes) detect rotation by measuring interference between two counter-propagating waves. This principle is referred to as the Sagnac effect. In an example Sagnac interferometer, a coherent source emits a wave, such as an electromagnetic wave (e.g., laser beam). A splitter divides the wave into two counter-propagating waves. The counter-propagating waves are guided in opposing directions around a closed path, which lies in the plane of rotation to be measured. The counter-propagating waves are recombined, eliciting interference between the waves. A detector measures the resulting interference, such as by measuring the position or phase shift of a fringe in an interference pattern. A detector may also measure amplitude or power at a position in the interference pattern, as these quantities are also related to the phase difference between the counter-propagating waves.

When there is no rotation in the plane of rotation and the path lengths traveled by the counter-propagating waves are equal or integer multiples of the wavelength, the detector detects constructive interference. When the interferometer undergoes rotation, the travel times of the counter-propagating waves around the closed path are different and the counter-propagating waves interfere destructively at the detector. In general, the phase difference measured at the detector for electromagnetic waves is:

$$\Delta \phi = \frac{8\pi N A}{\lambda c} \Omega$$

where N=number of trips around the closed path (e.g., for implementations with multiple turns); A=area enclosed by the closed path; $\Omega$=angular rotation velocity; $\Delta\phi$=phase difference signal; $\lambda$=wavelength of light; and c=speed of light. For detectors measuring power, the power P measured at a given phase difference is:

$$P = \frac{P_0}{2}[1 + \cos\Delta\phi]$$

where $P_0$=max power at zero phase shift; and $\Delta\phi$=phase difference signal. In general, the above two equations show that the phase difference signal is at least in part dependent on geometry, i.e., phase difference signal is large when the enclosed area 'A' is large and/or there is a large number ('N') of turns, and the larger the phase difference signal, the more prominent is the power response of the detector.

Ideally, the sensitivity of gyroscopes based on the Sagnac effect is limited by the sensitivity of the detector to changes in the phase difference. In real-world implementations, other factors besides rotation can affect the phase difference, thus introducing uncertainty and instability in the measured values. Factors that may be present in some gyroscopes include non-reciprocal properties of the closed path that affect the counter-propagating waves differently. For example, the media of the closed path may attenuate, scatter, slow, or otherwise affect one of the counter-propagating waves more than the other. The equation given above assumes that the counter-propagating waves contribute equally to the interference pattern, and thus mismatched amplitudes (e.g., due to unequal attenuation) will incorrectly appear to the detector as a phase shift due to rotation. When the counter-propagating waves travel at different speeds, the resulting phase shift will incorrectly appear to the detector as a phase shift due to constant rotation. Another example of a factor that may be present in some gyroscopes is an unstable or modulating amplitude or frequency of the output from the source. For detectors measuring power or amplitude, an unstable source amplitude will result in erroneous rotation measurements as the detector incorrectly correlates changing amplitude with changing phase. Another example of a factor that may be present in some gyroscopes is unwanted waves other than the primary counter-propagating waves that may result from polarization errors, backscattering, or other effects. Such unwanted waves may in some instances be sensitive to effects that otherwise don't affect the primary counter-propagating waves, such as temperature variations that affect the refractive index of the closed path, leading to additional instabilities. Other factors may contribute to instabilities in present and future gyroscope designs, including factors not yet known.

Some of these factors may be constant throughout the useful life of a gyroscope, such as those related to characteristics of the materials or manufacturing processes used to produce the gyroscope. Other factors may change or vary during use. For example, ambient thermal and electromagnetic characteristics of the operating environment or unstable power delivery to the source may introduce instabilities that change with time.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, systems and methods for mitigating bias instabilities in optical gyroscopes without reducing sensitivity to rotation are disclosed. In an implementation, an optical gyroscope includes one or more phase modulators to operate on two counter-propagating beams to introduce a phase shift between the two counter-propagating beams before the two counter-propagating beams are interferometrically combined to generate a rotation signal. The optical gyroscope further includes a signal generator to generate a first modulation frequency and a second modulation frequency to drive the one or more phase modulators. The first modulation frequency in isolation biases the rotation signal at an operating point sensitive to rotation of the optical gyroscope, and the second modulation frequency in isolation biases the rotation signal at an operating point insensitive to rotation of the optical gyroscope. The optical gyroscope further includes one or more control integrated circuits (ICs) to isolate a first portion of the rotation signal associated with the first modulation frequency and a second portion of the rotation signal associated with the second modulation frequency. The control ICs are further to determine a difference between the first and second portions of the rotation signal to remove one or more bias instabilities from the first portion of the rotation signal. In some embodiments, the one or more control integrated circuits (ICs) may comprise a plurality of lock-in amplifiers to isolate the first portion of the rotation signal and the second portion of the rotation signal. In some embodiments, the second modulation frequency is adjacent to an even harmonic of the first modulation frequency. In some embodiments, the second modulation frequency is lower than the first modulation frequency. In some embodiments, the one or more phase modulators are reciprocal phase modulators.

In an implementation, an optical gyroscope includes a first photodetector to measure a first signal associated with a first beam in isolation and a second photodetector to measure a second signal associated with a second beam in isolation. The first beam and the second beam are counter-propagating with respect to each other. The optical gyroscope further includes a third photodetector to measure a rotation signal associated with an interferometric combination of the first beam and the second beam. The optical gyroscope further includes one or more control integrated circuits (ICs) to remove one or more bias instabilities from the rotation signal using the first signal and the second signal. In some embodiments, the optical gyroscope further includes an optical splitter to split a portion of the first beam for routing to the first photodetector. In some embodiments, the first photodetector includes a doped portion of a waveguide associated with the first beam to measure an amplitude of the first beam using a photoconductive effect. In some embodiments, to remove the one or more bias instabilities from the rotation signal using the first signal and the second signal, the control ICs determine a difference between the first signal and the second signal associated with the one or more bias instabilities and modify the rotation signal in view of the determined difference between the first signal and the second signal. In some embodiments, to remove the one or more bias instabilities from the rotation signal, the control ICs provide the first signal and the second signal as inputs to a feedback loop and modify a driving frequency of one or more phase modulators using an output of the feedback loop. In some embodiments, the one or more phase modulators are reciprocal phase modulators.

In some implementations and embodiments, an optical gyroscope according to any embodiment described herein includes an integrated photonics chip. The integrated photonics chip includes a photodetector, one or more phase modulators, and an interferometric splitter. In some embodiments, the control ICs and integrated photonics chip are co-packaged on a printed circuit board. In some embodiments, the printed circuit board includes one or more accelerometers forming part of an inertial measurement unit. In some embodiments, the optical gyroscope further includes a silicon nitride chip including a rotation sensing element. In some embodiments, the rotation sensing element is a waveguide coil or a microresonator ring. In some embodiments, the optical gyroscope further includes an optical fiber coil as a rotation sensing element.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure relate to systems and methods for reducing bias instability in optical gyroscopes without reducing sensitivity to rotation. These systems and methods may be used with a variety of optical gyroscope architectures, components, and technologies. For example, these systems and methods may be used with traditional fiber optic-based gyroscopes (FOGs). In an example FOG configuration, a laser such as a gas laser, diode laser, fiber laser, or similar may be used as the coherent source of the interferometer. A beam splitter such as a prism or half-silvered mirror may be used to split and recombine the counter-propagating laser beams. The counter-propagating beams may be guided in a closed path using a series of mirrors or a length of optical fiber, for example. An advantage of using an optical fiber is that it may be coiled into several loops to improve the sensitivity of the gyroscope without increasing area. A photodetector based on photoelectric effects (e.g., photodiodes or phototransistors), photochemical effects, or other effects may be used to measure the power of the recombined beam (e.g., the rotation signal) and detect changes in power associated with a phase difference due to rotation or other factors. The rotation signal may comprise multiple component signals, some of which may be sensitive to rotation, and other which may not be sensitive rotation (e.g., various harmonics, noise, etc.).

Technological advances permit optical gyroscopes to be scaled down significantly while maintaining similar or superior performance to FOG-based designs. For example, many components may be implemented using integrated photonics (e.g., silicon photonics or photonics with other materials and substrates) techniques. The Silicon Photonics Optical Gyroscope (SiPhOG™) technologies developed by Anello Photonics® are examples of integrated photonics-based gyroscopes. In an example integrated photonics gyroscope configuration, the coherent source may be a semiconductor laser made of III-V compound semiconductor, germanium, or other materials, and may be on-chip or coupled to a silicon platform via flip-chip bonding, epitaxial growth, or other techniques. Photodetectors may be photoconductive detectors, PIN detectors, or avalanche detectors integrated with similar techniques. Waveguides such as strip waveguides and rib waveguides may be used to guide the counter-propagating beams. Couplers or splitters ("coupler" and "splitter" are used interchangeably herein, unless the context otherwise requires) such as directional couplers, Y-branch couplers, and multi-mode interference (MMI) devices may be used to split or combine one or more beams. A splitter may be designed with different splitting ratios, such as a 90/10 split (e.g., 90% of the power is transmitted through the primary waveguide and 10% is split off to a secondary waveguide) or a 50/50 split. Numerous other optical components relevant to optical gyroscope designs may be implemented using integrated photonics techniques as well, such as polarizers. Components described herein may be constructed from a substrate material, epitaxially grown, bonded to the substrate, or coupled to the substrate with other techniques in various embodiments.

In at least one embodiment, one or more waveguides may be constructed with a core of silicon nitride ($Si_3N_4$) and cladding of fused silica or oxide (this structure may be referred to as a SiN waveguide). Fabrication process for both configurations (i.e. SiN core in fused silica or SiN core in oxide) are described in the U.S. patent application Ser. No. 16/894,120, titled "Single-layer and multi-layer structures for integrated silicon photonics optical gyroscopes," filed Jun. 5, 2020, now U.S. Pat. No. 10,969,548, issued Apr. 6, 2021, and U.S. patent application Ser. No. 17/249,603, titled, "Process flow for fabricating integrated photonics optical gyroscopes," filed Mar. 5, 2021, now U.S. Pat. No. 11,187,532, issued Nov. 30, 2021, both of which are incorporated herein by reference. SiN waveguides may be used, for example, in one or more rotation sensing coils in an integrated photonics-based gyroscope (e.g., analogous to an optical fiber coil in a FOG). In at least one embodiment, a microresonator ring may be used in place of a coiled waveguide for sensing rotation.

Additional components may be added to the basic Sagnac interferometer architecture to provide various advantages. For example, one or more reciprocal phase modulators driven at a modulation frequency $f_m$ may be inserted in one or both legs of the sensing coil to introduce a phase difference between counter-propagating beams. The phase difference may bias the power signal at the detector in a region of greater slope such that changes in rotation cause greater changes in the power signal, thus improving the sensitivity of the gyroscope. The modulation frequency that provides optimal sensitivity in a given configuration is the proper frequency $f_p$.

Non-ideal characteristics of the gyroscope components and the operating environment may introduce other sources of phase shift or amplitude modulation that mix with the rotation signal measured at a photodetector. For example, the optical fiber or waveguide of the sensing coil may introduce phase or amplitude non-reciprocities that attenuate, scatter, slow, reflect, or otherwise affect one of the counter-propagating beams more than the other. Phase modulators in an integrated photonics environment may introduce unwanted amplitude modulations, which may be unstable. The laser or detector may also introduce amplitude modulations due to unstable power supplies. In the confined layout of an integrated photonics-based gyroscope, electrical or optical coupling and crosstalk between various components may also be sources of non-idealities.

The detector may not be able to discriminate between phase shifts (or related changes in power) due to rotation and phase shifts or amplitude modulations (or related changes in power) due to these intervening sources, and thus the resulting rotational signal may be unstable and insufficiently sensitive for various applications. This is particularly problematic for applications such as dead reckoning navigation systems, which rely on the sum of previous rotation and acceleration measurements to determine present location. Small instabilities quickly accumulate as large positional errors and make dead reckoning systems unreliable beyond a limited timeframe. While additional components such as the reciprocal phase modulators previously described may counteract some of the effects these non-idealities by increasing sensitivity of the gyroscope, these components themselves may be additional sources of phase shifts, amplitude modulations, and other factors that contribute to an erroneous rotation signal.

Aspects and embodiments of the present disclosure address the above-mentioned and other challenges by providing systems and methods for measuring bias offsets in gyroscopes based on the Sagnac effect, such as fiber optic gyroscopes and optical gyroscopes based on integrated photonics. Aspects and embodiments of the present disclosure further provide systems and methods for determining a normalized rotation signal based on the measured bias offsets. Aspects and embodiments may utilize additional hardware such as a processor to determine the normalized rotation signal.

Aspects and embodiments of the present disclosure may provide a secondary modulation frequency for one or more reciprocal phase modulators, herein referred to as the normalization frequency $f_n$, to introduce a secondary bias with minimal sensitivity to rotation. In at least one embodiment, $f_n$ may be adjacent to an even harmonic of the proper frequency, $f_p$. In at least one embodiment, $f_n$ may be smaller than $f_p$. A measured response associated with $f_p$ may comprise the rotation-sensitive portion of the rotation signal mixed with one or more erroneous component signals corresponding to the non-idealities previously described. A measured response associated with $f_n$ is not sensitive to rotation (due to proper selection of $f_n$) but comprises one or more erroneous signals corresponding to the erroneous signals of the $f_p$ measurement. The responses at $f_p$ and $f_n$ may be measured simultaneously, and common sources of bias instability may be removed from the response at $f_p$ by subtracting the response at $f_n$. The resulting signal maintains sensitivity to rotation similar to the response at $f_p$ while rejecting various sources of bias instability.

Aspects and embodiments of the present disclosure may provide additional optical and electrical circuitry to monitor the two counter-propagating beams before interferometric recombination and detect sources of bias instability such as amplitude modulation with differing responses in the counter-propagating beams or amplitude modulation with on-chip reflection. In at least one embodiment, splitters in both legs of the sensing coil may route portions of the counter-propagating beams to additional detectors. In at least one embodiment, doped segments of the waveguides in both legs of the sensing coil may monitor the counter-propagating beams. In at least one embodiment, the rotation signal may be post-processed using the monitoring signals associated with the two counter-propagating beams to remove bias instabilities and normalize the rotation signal. For example, the difference in amplitudes between the monitoring signals may correspond to a correction of the rotation signal. In at least one embodiment, the monitoring signals may be inputs to a feedback loop that adjusts the modulation frequency $f_m$ of one or more reciprocal phase modulators to maintain zero bias when there is no rotation. These applications of the monitoring signals may be combined with each other or with other applications to reduce bias instabilities in various embodiments.

Accordingly, aspects and embodiments of the present disclosure determine a normalized rotation signal without reducing sensitivity to rotation. As a result, gyroscopes may maintain enhanced accuracy and precision for longer periods of time. Applications such as dead reckoning navigation systems may experience less drift over longer timeframes, reducing reliance on global navigation satellite systems (GNSS) and other absolute positioning systems. These advantages may be useful for applications where GNSS signals are absent or unreliable, as well as for applications that require a smaller form factor or lower energy draw than GNSS sensors can provide. Aspects and embodiments of the present disclosure also operate in real time and are responsive to variations in individual optical gyroscopes and their unique operating environments. Thus, bias normalization need not be performed during manufacturing, and environmental sources of bias instabilities may be mitigated in real time throughout the useful life of a gyroscope. While aspects and embodiments of the present disclosure are described with respect to optical gyroscopes, they may be applied in other fields and applications such as quantum and AI/ML computing, radio frequency and microwave applications, and digital communications.

Figure 1:
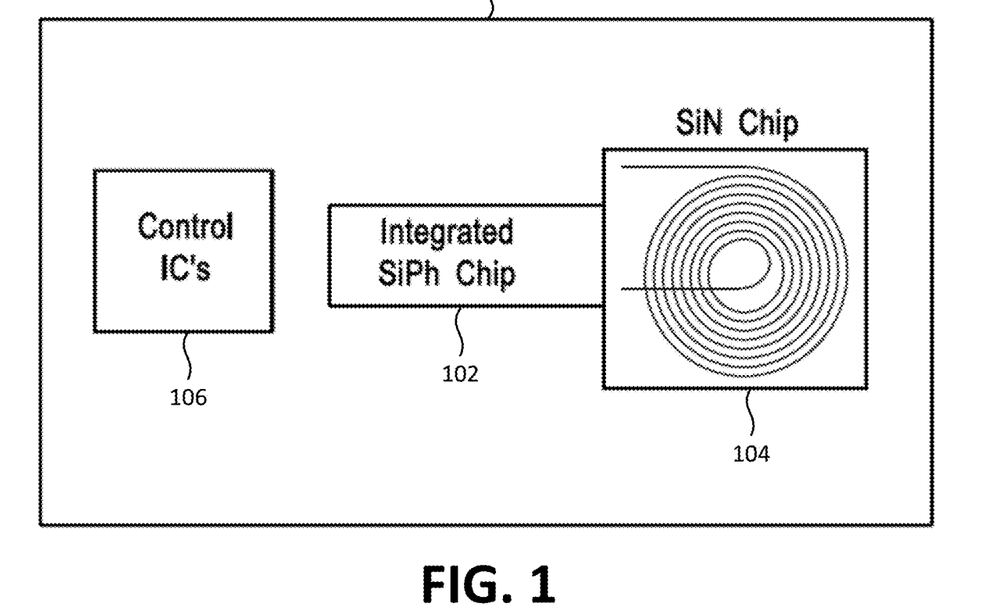
FIG. 1 is a block diagram of an example optical gyroscope based on integrated photonics technology, according to an embodiment of the present disclosure.

FIG. 1 illustrates a block diagram of an example optical gyroscope 100 based on integrated photonics technology, such as gyroscopes developed by Anello Photonics®. Optical gyroscope 100 includes integrated photonics chip 102, silicon nitride (SiN) chip 104, and control integrated circuits (ICs) 106. In some embodiments, optical gyroscope 100 may include more or fewer components than those depicted in FIG. 1, as well as alternative components performing the same or similar functions as those depicted in FIG. 1. In at least one embodiment, optical gyroscope 100 may comprise a printed circuit board (PCB) or other substrate upon which integrated photonics chip 102, SiN chip 104, and control Ics 106 are mounted or co-packaged. Components may be aligned and mounted on a PCB using automated pick-and-place techniques. Optical gyroscope 100 may be part of an inertial measurement unit (IMU), which may comprise other IMU components such as one or more additional gyroscopes (e.g., for different axes or for redundancy) and one or more accelerometers. One or more of these IMU components may be mounted on the same PCB as optical gyroscope 100. For example, a 3-axis accelerometer IC may be mounted on the same PCB as optical gyroscope 100.

Integrated photonics chip 102 contains optical and electrical components for implementing a Sagnac interferometer, such as one or more lasers, phase shifters, detectors, splitters, polarizers, or other components. Example lasers may include III-V compound lasers or other types of lasers as described herein. Example detectors may include photoconductive detectors, PIN detectors, or avalanche detectors comprising silicon, germanium, silicon germanium, or other compound semiconductors (e.g., indium phosphide, gallium arsenide, other III-V semiconductors). Components may be routed and connected with electrical wires or optical waveguides as appropriate. In at least one embodiment, one or more components may be external to integrated photonics chip 102 and maybe be joined to integrated photonics chip 102 through electrical or optical interfaces such as electrical pads or optical edge couplers or grating couplers. Integrated photonics chip 102 may further include implant regions surrounding one or more optical components to minimize stray light bouncing around in the chip.

SiN chip 104 comprises a coiled waveguide providing the closed-loop rotation sensing coil of the interferometer. In at least one embodiment, the sensing coil may comprise multiple SiN chips 104 in a multi-layer configuration with waveguides appropriately coupled between layers to form a multi-layer sensing coil. Details of a stacked multi-layer gyro configuration are covered in provisional application 62/858,588 filed on Jun. 7, 2019, titled, "Integrated Silicon Photonics Optical Gyroscope on Fused Silica Platform." A follow-up provisional application 62/896,365 filed on Sep. 5, 2019, titled "Single-layer and Multi-layer Structures for Integrated Silicon Photonics Optical Gyroscopes" describes additional embodiments. These two provisional applications were converted into a non-provisional application, which was issued as U.S. Pat. No. 10,969,548. All these applications are incorporated herein by reference. SiN chip 104 may comprise multiple independent sensing coils in various embodiments, which may be useful for providing redundant gyroscope configurations. In at least one embodiment, a microresonator ring may be used in place of a coiled waveguide for sensing rotation. In at least one embodiment, the sensing coil (or microresonator ring) may comprise a material other than SiN.

In at least one embodiment, integrated photonics components may be mixed with traditional FOG components and other off-chip components. For example, a coiled optical fiber may be used in place of SiN chip 104. External lasers or detectors may be used in combination with components on integrated photonics chip 102 (e.g., in a laboratory setting).

Control Ics 106 provide control and auxiliary functions for optical gyroscope 100. For example, control Ics 106 may provide power management components such as one or more voltage or current regulators, filtering components, and other components relevant to power management. Control Ics 106 may include one or more analog or digital components to process data associated with optical gyroscope 100 and send and receive communications with external modules. Example components include amplifiers (e.g., lock-in amplifiers), filters, processors, microcontrollers, field-programmable gate arrays (FPGAs), programmable logic devices (PLDs), digital signal processors (DSPs), and application-specific integrated circuits (ASICs). Example communications protocols include UART, I2C, SPI, CAN bus, and USB. Control Ics 106 may provide protective components such as electrostatic discharge (ESD) suppressors and radio frequency (RF) shields. Control Ics 106 may provide other components and functions not described herein. In at least one embodiment, one or more control or auxiliary components or functions may be provided external to optical gyroscope 100, such as an external power regulator or external processor.

System-level integration of an integrated photonics based front-end chip (e.g., integrated photonics chip 102) and a waveguide chip (e.g., SiN chip 104) have been covered in provisional applications 62/872,640 filed Jul. 10, 2019, titled "System Architecture for Silicon Photonics Optical Gyroscopes", and 62/904,443 filed Sep. 23, 2019, titled, "System Architecture for Silicon Photonics Optical Gyroscopes with Mode-Selective Waveguides." These two provisional applications were converted into a non-provisional application, which was issued as U.S. Pat. No. 10,731,988. All these applications are incorporated herein by reference.

Figure 2:
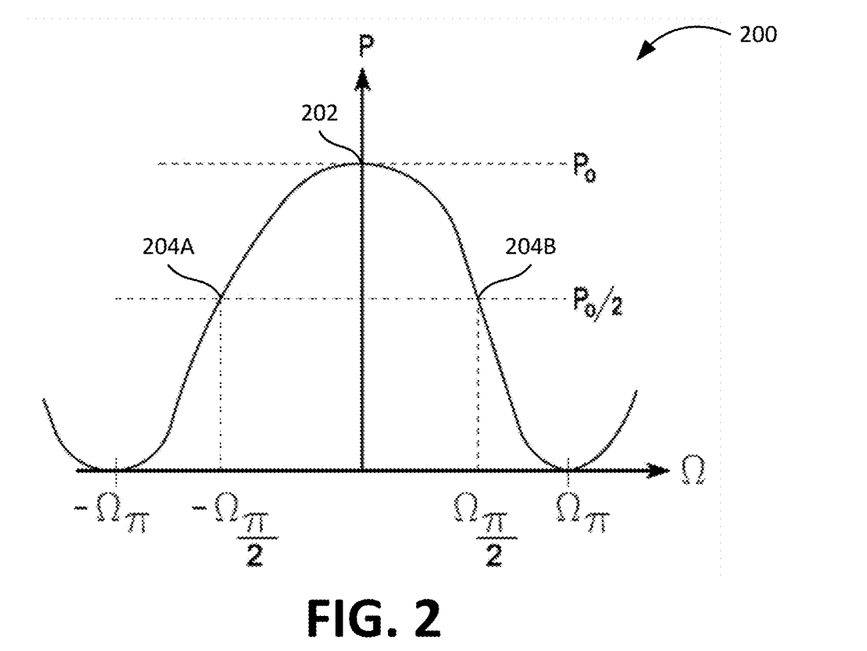
FIG. 2 is a graph illustrating power measured at an example detector in an example optical gyroscope for various phase shifts, according to an embodiment of the present disclosure.

FIG. 2 is an example graph 200 illustrating power measured at a detector in an optical gyroscope (y-axis) for various phase shifts (x-axis) as described by the previously presented equation:

$$P = \frac{P_0}{2}[1 + \cos\Delta\phi]$$

In the Sagnac interferometer previously described, zero rotation corresponds to zero phase shift at the detector and maximum power $P_0$. In graph 200, the peak of the cosine function at operating point 202 corresponds to the previously described interferometer. Because the slope of the cosine function around this operating point is approximately zero, phase shifts due to rotation will not result in a noticeable change in power. Thus, the sensitivity of the gyroscope is minimal in the region around operating point 202. Sensitivity of the gyroscope may be improved by biasing the zero-rotation operating point in a region of greater slope. Operating points 204A-B at phase shifts of $$\pm\frac{\pi}{2}$$

are examples of operating points with steeper slope and improved sensitivity to rotation. A gyroscope may be biased to operating points 204A-B by introducing unequal path lengths, travel times, or phase shifts between the two counter-propagating beams in some embodiments.

Figure 3:
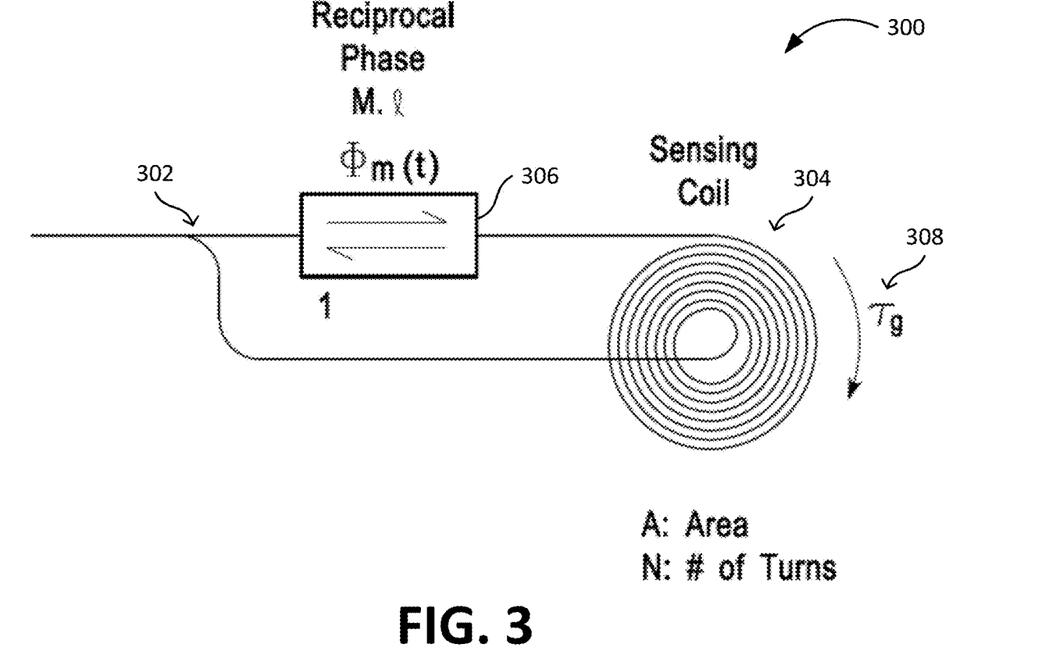
FIG. 3 is a partial schematic of an example optical gyroscope, according to an embodiment of the present disclosure.

FIG. 3 illustrates a partial schematic of example optical gyroscope 300, which may correspond to optical gyroscope 100 of FIG. 1 based on integrated photonics. Splitter 302 splits the incoming beam into counter-propagating beams and later recombines the counter-propagating beams. In at least one embodiment, splitter 302 may be a component of integrated photonics chip 102 of FIG. 1. Sensing coil 304 may correspond to the coiled waveguide of SiN chip 104 of FIG. 1. Sensing coil 304 may correspond to a loop of optical fiber in some embodiments. Other components of optical gyroscope 300 are not depicted in FIG. 3, such as a laser or control Ics.

To introduce a phase shift and bias the operating point of optical gyroscope 300, reciprocal phase modulator 306 may be inserted in one of the legs of the closed path (e.g., between splitter 302 and one end of sensing coil 304). Reciprocal phase modulator 306 may introduce equal phase shift modulations at phase modulation frequency $f_m$ to both counter-propagating beams. The counter-propagating beams will experience different travel times from reciprocal phase modulator 306 to the detector, as one beam passes through reciprocal phase modulator 306 before entering sensing coil 304 and the other passes through reciprocal phase modulator 306 after exiting sensing coil 304. The resulting biasing modulation $\Delta\phi_m$ after recombining the beams is:

$$\Delta\phi_m = \phi_m(t) - \phi_m(t - \tau_g)$$

where $\phi_m(t)$=time domain phase modulation of reciprocal phase modulator 306; and $\tau_g$=round trip time of sensing coil 304.

Examples of reciprocal phase modulators that may be present in some embodiments include high-speed modulators (e.g., using piezo-based or electro-optic-based materials) and thermal modulators. In at least one embodiment, reciprocal phase modulator 306 may comprise multiple phase modulator components in a series configuration, such as a high-speed modulator followed by a thermal modulator. In various embodiments, one or more additional phase modulators may be placed in the closed path, such as in the other leg of the sensor coil (e.g., see FIG. 5).

Figure 4:
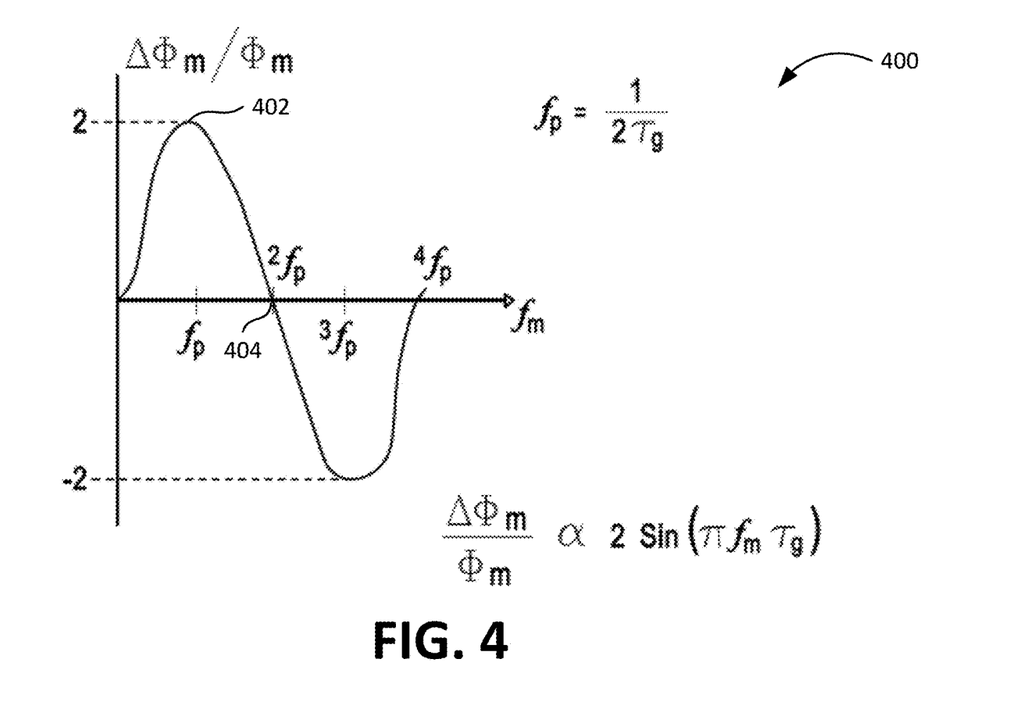
FIG. 4 is a graph illustrating the sensitivity of an example optical gyroscope for various modulation frequencies of an example reciprocal phase modulator, according to an embodiment of the present disclosure.

FIG. 4 is an example graph 400 illustrating the sensitivity of optical gyroscope 300 for is the ratio various modulation frequencies $f_m$ of reciprocal phase modulator 306. The sensitivity $$\frac{\Delta\phi_m}{\phi_m}$$

is the ratio of the biasing modulation to the phase modulation:

$$\frac{\Delta\phi_m}{\phi_m} \propto 2\sin(\pi f_m \tau_g)$$

By adjusting the phase modulation frequency $f_m$, the counter-propagating beams can be made to arrive at the detector with varying phase shifts in the absence of rotation, thereby setting the operating point. The sensitivity is maximum at the proper frequency $f_m = f_p$ corresponding to peak 402 of the sine function. The sensitivity is also maximum at odd harmonics of the proper frequency $f_p$ and null at even harmonics of the proper frequency $f_p$ (e.g., at position 404). Referring to FIG. 2, operating points 204A-B correspond to an operating point biased at the proper frequency $f_p$. Furthermore, the operating point will alternate between operating points 204A-B at the proper frequency $f_p$.

Figure 5:
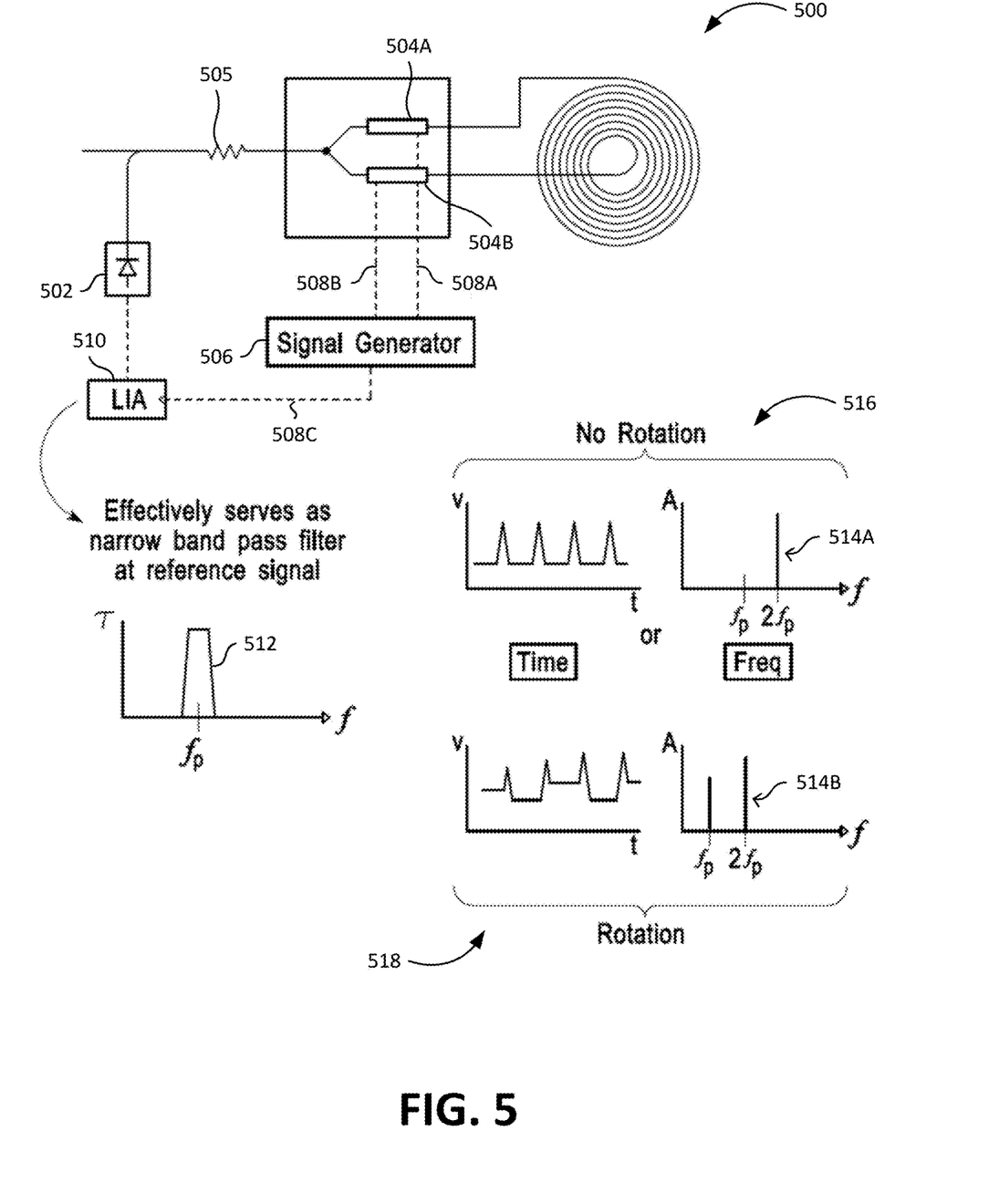
FIG. 5 is a partial schematic of an example optical gyroscope that biases a rotation signal at an operating point with increased sensitivity to rotation, according to an embodiment of the present disclosure.

FIG. 5 illustrates a partial schematic of example optical gyroscope 500, which may correspond to optical gyroscope 300 of FIG. 3. Detector 502 detects the modulated interference signal after recombination. In at least one embodiment, detector 502 may be a component of integrated photonics chip 102 of FIG. 1. Reciprocal phase modulators 504A-B introduce phase modulation to both counter-propagating beams and one or both ends of the sensing coil. Both reciprocal phase modulators 504A-B may be present in some embodiments, and a single reciprocal phase modulator (e.g., 504A) may be present in other embodiments. In at least one embodiment, one or both reciprocal phase modulators 504A-B may correspond to reciprocal phase modulator 306 of FIG. 3. Other gyroscope components, such as polarizer 505, may be present in various embodiments.

Signal generator 506 generates modulation frequency $f_m$ 508A-B to drive reciprocal phase modulators 504A-B. In at least one embodiment, signal generator 506 may be a component of integrated photonics chip 102 or control Ics 106 of FIG. 1. The output of detector 502 is provided to lock-in amplifier 510, and signal generator 506 provides modulation frequency $f_m$ 508C as a reference signal for lock-in amplifier 510. In at least one embodiment, modulation frequency $f_m$ is the proper frequency $f_p$, which sets the operating point bias of optical gyroscope 500 as described with respect to FIG. 4. Lock-in amplifier 510 effectively serves as a narrow bandpass filter 512 at $f_p$, isolating $f_p$ and filtering out harmonics of $f_p$ (e.g., at position 514A-B) and other undesirable signals. When optical gyroscope 500 is not experiencing rotation, no additional non-reciprocal phase shift is introduced by rotation and the system remains biased at the operating point. Lock-in amplifier 510 does not detect a response at $f_p$. In time-domain and frequency-domain plots 516 illustrating zero rotation of optical gyroscope 500, the frequency component $f_p$ is negligible. When optical gyroscope 500 is experiencing rotation, an additional non-reciprocal phase shift is introduced and the system deviates from the operating point. Lock-in amplifier 510 detects a response at $f_p$ as a result. In time-domain and frequency domain plots 518 illustrating non-zero rotation of optical gyroscope 500, the frequency component $f_p$ is non-zero. In at least one embodiment, the functionality of lock-in amplifier 510 may be implemented in software, e.g., with finite or infinite impulse response filters, fast Fourier transforms, or other algorithms.

Biasing the operating point of an optical gyroscope to a region of sufficient slope using these techniques increases the sensitivity of the optical gyroscope to rotation. Furthermore, these techniques reduce the impact of some sources of bias instability such as amplitude modulation, backscattering, polarization coupling, and other nonreciprocities. For example, lock-in amplifier 510 filters out sources of amplitude modulation outside $f_p$. However, other sources of bias instability may continue to affect rotation measurements despite these techniques. For example, non-reciprocal phase shifts induced in the sensing coil, waveguides, or phase modulators are still indistinguishable from rotation. As an additional example, the added phase modulators (e.g., phase modulators 504A-B) may introduce unstable amplitude modulations. Other examples of sources of bias instability may include electrical crosstalk between phase modulators and detectors, unstable laser or power sources, and parasitic amplitude modulation coupled with on-chip reflections.

Figure 6:
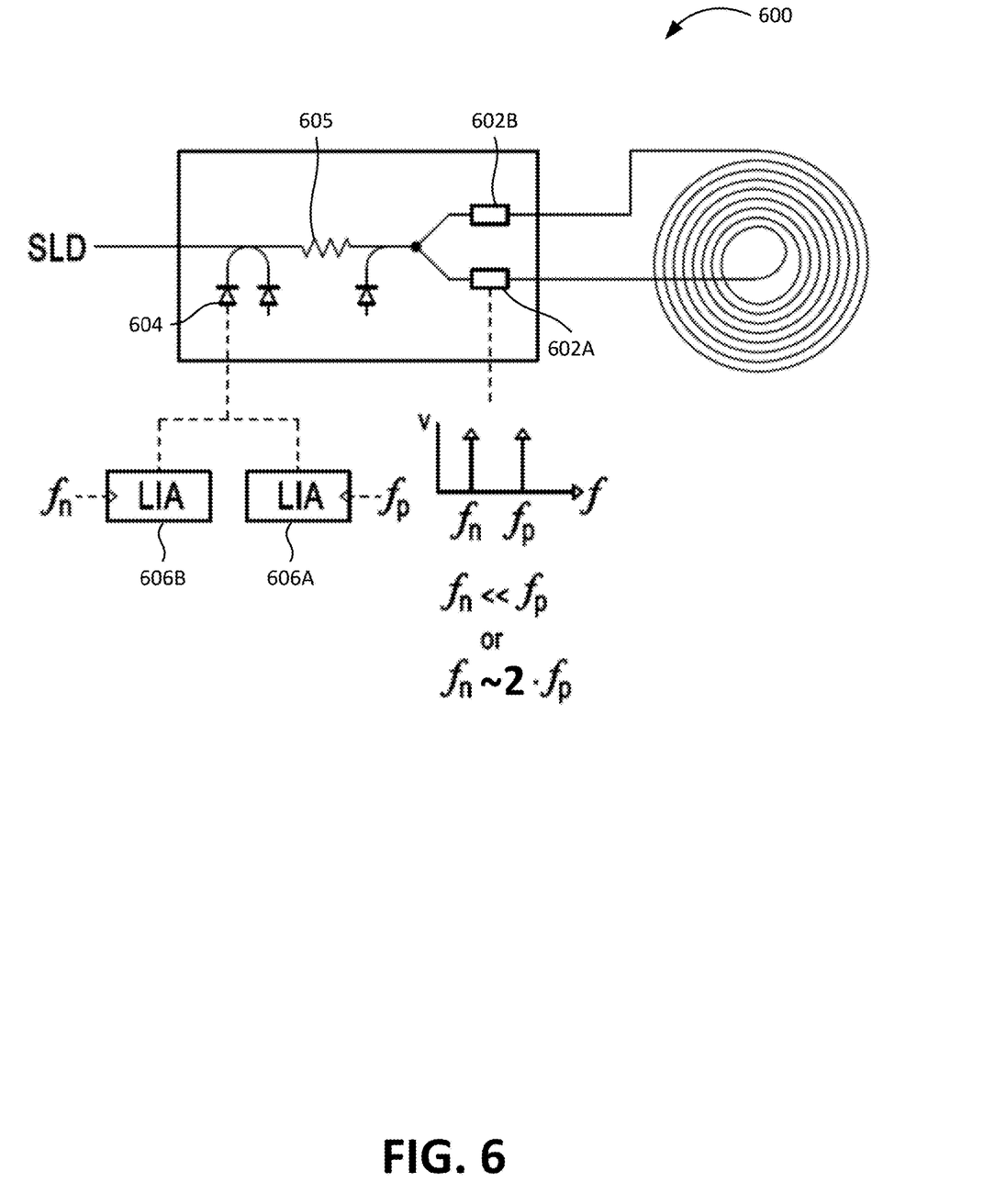
FIG. 6 is a partial schematic of an example optical gyroscope that reduces bias instability by generating two modulation frequencies and subtracting common-mode signals, according to an embodiment of the present disclosure.

FIG. 6 illustrates a partial schematic of an example optical gyroscope 600 that reduces bias instability by generating two modulation frequencies and subtracting common-mode signals. Reciprocal phase modulators 602A-B may correspond to reciprocal phase modulators 504A-B of FIG. 5. A signal generator (not depicted in FIG. 6) may generate two modulation frequencies $f_p$ (proper frequency) and $f_n$ (normalization frequency) to drive one or both reciprocal phase modulators 602A-B. In at least one embodiment, modulation frequencies $f_p$ and $f_n$ may be superposed to drive a single phase modulator at both frequencies. In at least one embodiment, modulation frequencies $f_p$ and $f_n$ may drive separate phase modulators in a series or parallel configuration in the optical circuit (not depicted in FIG. 6). The output of detector 604 is provided to lock-in amplifiers 606A-B. Modulation frequencies $f_p$ and $f_n$ are provided to lock-in amplifiers 606A-B as reference signals. As described with respect to FIG. 5, one or both of lock-in amplifiers 606A-B may be implemented in software in at least one embodiment. Other gyroscope components, such as polarizer 605, may be present in various embodiments.

In at least one embodiment, normalization frequency $f_n$ may be set to a value adjacent to $2f_p$ or another even harmonic of $f_p$. The sensitivity $$\frac{\Delta\phi_m}{\phi_m}$$

at $f_n = 2f_p$ is ideally:

$$\frac{\Delta\phi_m}{\phi_m} \propto 2\sin(\pi(2f_p)\tau_g) = 0$$

This operating point corresponds to position 404 of FIG. 4, where the gyroscope has no sensitivity to rotation. The output of lock-in amplifier 606A with reference signal $f_p$ will ideally reflect actual rotation of optical gyroscope 600, while the output of lock-in amplifier 606B with reference signal $f_n$ will ideally remain zero regardless of rotation. Both lock-in amplifier outputs may deviate from ideal conditions due to one or more sources of bias instability as previously described. Common-mode sources of bias instability that equally affect both outputs may thus be eliminated by subtracting the output of lock-in amplifier 606B from the output of lock-in amplifier 606A. This will normalize the rotation signal without reducing sensitivity. As described with respect to FIG. 5, the output of detector 604 may include harmonics of proper frequency $f_p$, which are filtered out by lock-in amplifier 606A (corresponding to lock-in amplifier 510). However, these harmonics may mix with the signal at $f_n$ when $f_n = 2f_p$ exactly, and thus it may be difficult to measure the common-mode component at $f_n$. By setting $f_n$ to a value adjacent to $2f_p$ (or another even harmonic) such that the harmonics of $f_p$ are outside of the detection bandwidth of lock-in amplifier 606B (e.g., bandwidth 512 of FIG. 5), the signal at $f_n$ may still be sufficiently insensitive to rotation and the common-mode rejection benefits may be achieved. In at least one embodiment, normalization frequency $f_n$ may be set lower than $f_p$ (e.g., closer to 0 Hz, i.e. DC signal) at a modulation frequency with low sensitivity similar to $2f_p$. Normalization frequencies may be one or more orders of magnitude lower than $f_p$, for example. Various normalization frequencies above or below $f_p$ may be chosen in various embodiments to achieve minimization of common-mode bias instabilities without significantly reducing sensitivity to rotation. Normalization frequencies may deviate slightly from the example frequencies given above and still achieve sufficient results in some embodiments. For example, the output of lock-in amplifier 606B with reference signal $f_n$ may exhibit some amount of sensitivity to rotation due to real-world conditions (e.g., difficulty of precisely identifying and maintaining an ideal normalization frequency $f_n$). As long as the sensitivity to rotation at $f_n$ is substantially less than at $f_p$ (e.g., sensitivity is at or close to 0), the sensitivity of the normalized signal will not be substantially reduced after the common-mode signals are removed. Thus, a normalization frequency $f_n$ exhibiting minimal sensitivity to rotation may still be considered sufficiently insensitive to rotation in various applications.

One or more of the normalization operations (e.g., subtracting the common-mode signal) may be performed by one or more control ICs (e.g., control ICs 106 of FIG. 1). For example, lock-in amplifiers 606A-B may be implemented by one or more control ICs using hardware or software and in the analog or digital domains. As an additional example, the outputs of lock-in amplifiers 606A-B may be routed to one or more control ICs comprising a processor, microcontroller, FPGA, PLD, ASIC, DSP, other analog or digital components, or a combination of components performing subtraction of the common-mode signal(s) to remove sources of bias instability from the rotation-sensitive signal. Control ICs may perform additional signal processing procedures and may provide the post-processed rotation signal at a communications interface of optical gyroscope 600 (e.g., UART, I2C, CAN bus, etc.).

Bias instabilities may be frequency-dependent in some environments, and thus the common-mode signal between $f_p$ and $f_n$ may not capture all of the bias instabilities at $f_p$. In at least one embodiment, more than one normalization frequency may be generated and processed to normalize the rotation signal, where each normalization frequency may overlap with different bias instabilities at $f_p$. For example, normalization frequencies $f_{n_1}$ through $f_{n_i}$ may each be insensitive to rotation and may each capture different sources of bias instabilities. Control ICs may use a linear combination or other combination of normalization outputs associated with frequencies $f_{n_1}$ through $f_{n_i}$ to normalize the rotation signal. Normalization frequencies $f_{n_1}$ through $f_{n_i}$ may include frequencies above or below $f_p$. In at least one embodiment, the normalization frequency or frequencies may be changed or tuned during operation of optical gyroscope 600, e.g., by using a feedback loop.

Figure 7:
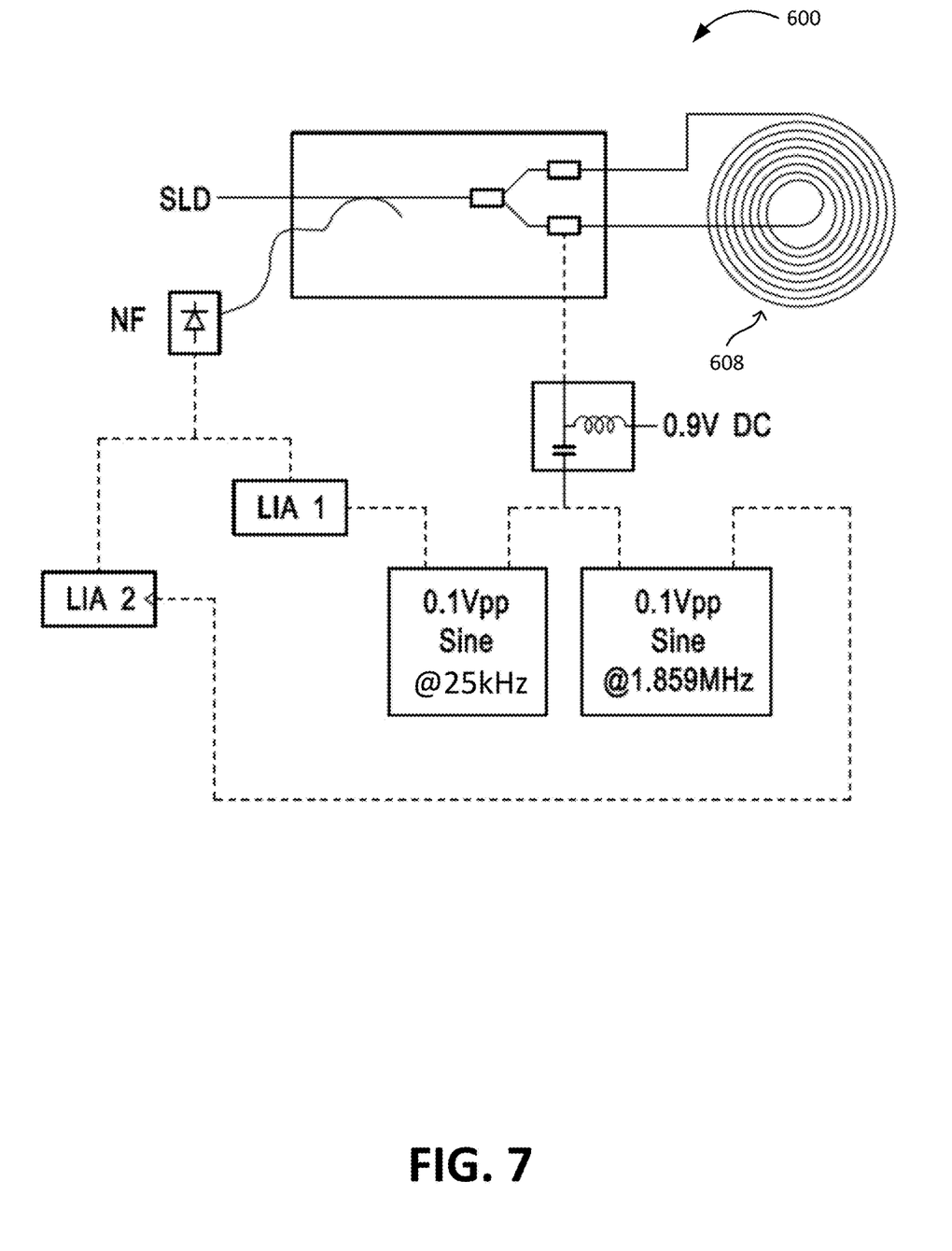
FIG. 7 is an example experiment with an example optical gyroscope driven at proper frequency $f_p$=1.869 MHz and normalization frequency $f_n$=25 kHz, according to an embodiment of the present disclosure.
Figure 8:
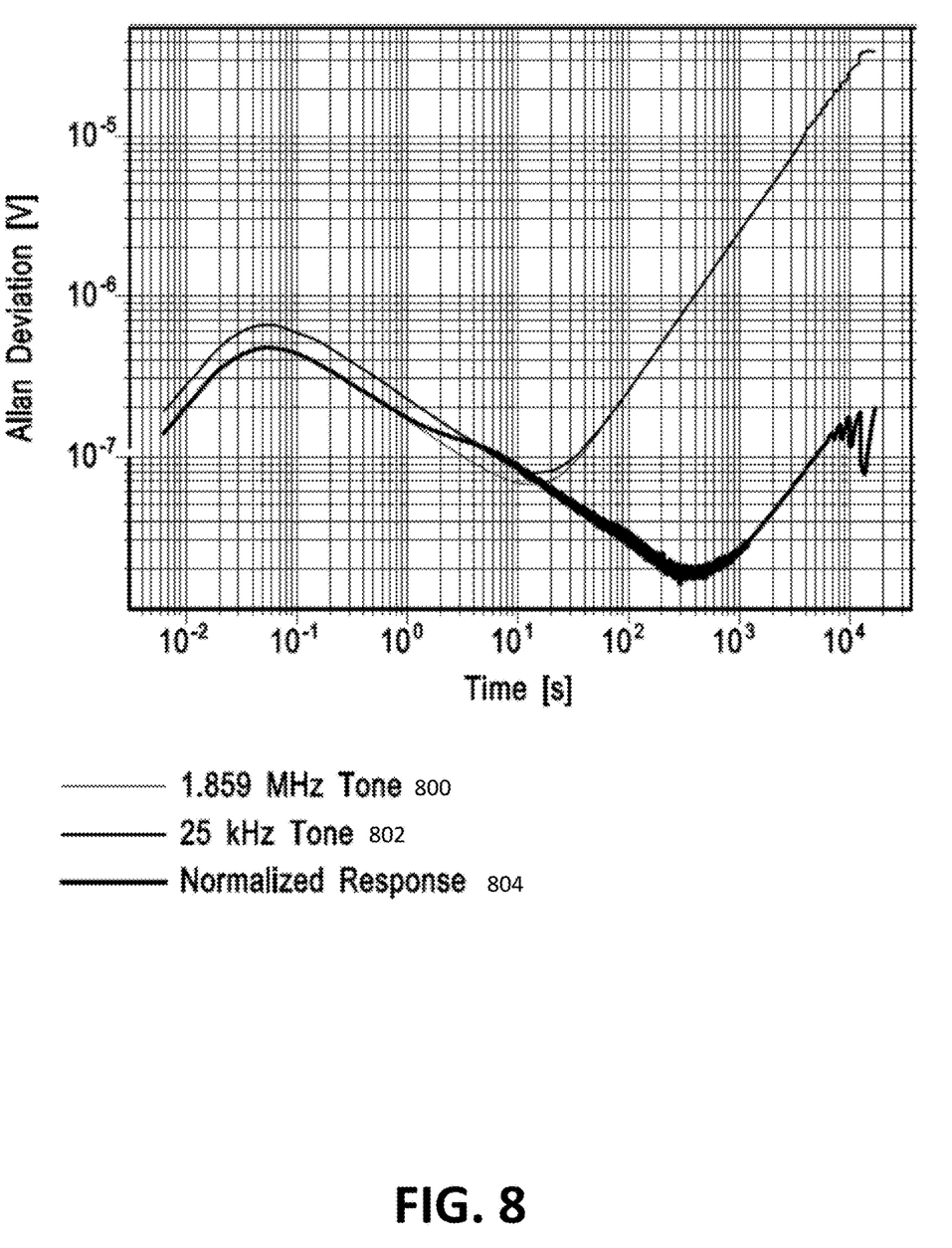
FIG. 8 illustrates Allan Deviation curves for the bias instabilities associated with frequencies $f_p$ and $f_n$ in an example experiment, as well as the normalized response calculated by removing the common-mode bias instabilities, according to an embodiment of the present disclosure.

FIGS. 7-8 illustrate an example experiment with optical gyroscope 600 driven at proper frequency $f_p$=1.869 MHz and normalization frequency $f_n$=25 kHz. Here, the normalization frequency is approximately two orders of magnitude less than the proper frequency, but other values may be chosen in other embodiments. Sensing coil 608 may be present or removed in various experiments to facilitate measurement of various sources of bias instabilities. For example, with sensing coil 608 removed, bias instabilities due to amplitude modulation and on-chip reflections may be measured. FIG. 8 depicts the Allan Deviation curves for the bias instabilities associated with frequencies $f_p$ (800) and $f_n$ (802), as well as the normalized response calculated by removing the common-mode bias instabilities (804). When examined alone, frequencies $f_p$ and $f_n$ are stable out to integration times of approximately 15 seconds before the Allan Deviation curves reach a bias instability. The normalized signal exhibits improved stability out to integration times of approximately 400 seconds in this experiment. With sensing coil 608 reattached, the sensitivity to rotation is approximately $$87.3 \frac{\mu V}{deg * s} \text{ at } f_p \text{ and } 1.4 \frac{\mu V}{deg * s} \text{ at } f_n,$$

resulting in minimal loss of sensitivity when the two signals are combined. The values given here with respect to FIGS. 7-8 are illustrative examples, but the scope of the present disclosure is not limited to these specific values. Other values are possible in various embodiments.

Figure 9A:
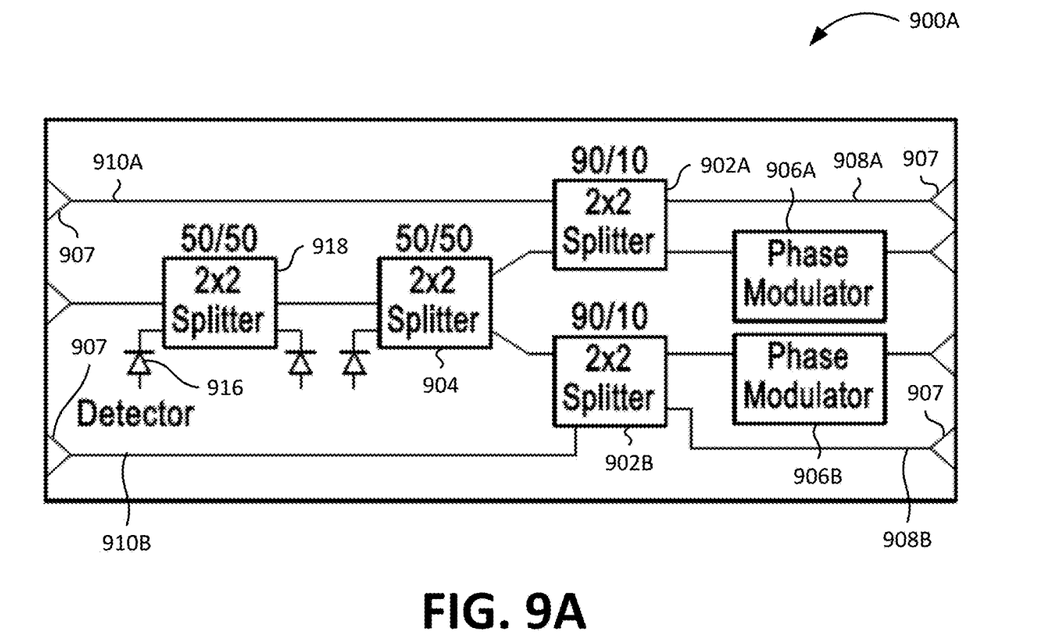
FIG. 9A is a circuit diagram of an example optical gyroscope providing additional monitoring circuitry for monitoring counter-propagating beams using external detectors, according to an embodiment of the present disclosure.
Figure 9B:
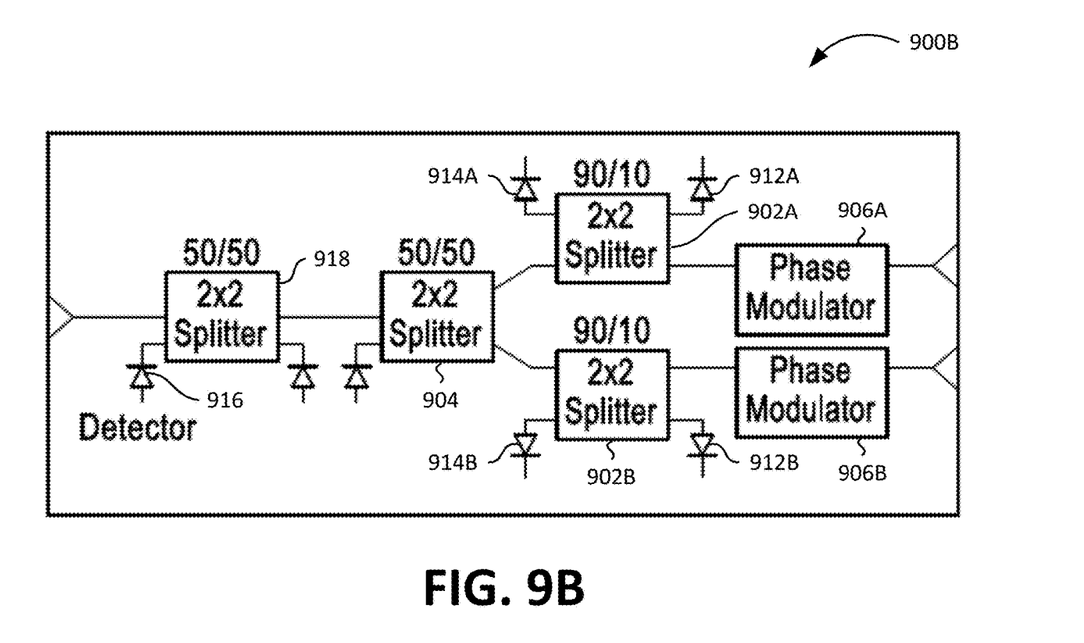
FIG. 9B is a circuit diagram of an example optical gyroscope providing additional monitoring circuitry for monitoring counter-propagating beams using on-chip detectors, according to an embodiment of the present disclosure.

FIGS. 9A-B illustrate circuit diagrams of example optical gyroscopes providing additional monitoring circuitry for the counter-propagating beams. Optical gyroscope 900A is configured for external detection and optical gyroscope 900B is configured for on-chip detection. In at least one embodiment, optical gyroscopes 900A-B include optical splitters 902A-B on each path to and from the sensing coil (sensing coil not depicted in FIGS. 9A-B). Optical splitters 902A-B may be positioned between interferometric splitter 904 (e.g., corresponding to splitter 302 of FIG. 3) and phase modulators 906A-B (e.g., corresponding to reciprocal phase modulators 602A-B of FIG. 6). Optical splitters 902A-B may be positioned elsewhere in various embodiments, such as between phase modulators 906A-B and the sensing coil. Optical splitters 902A-B may be 90/10 splitters (e.g., 90% of the signal remains in the interferometer and 10% is routed to a detector) or may use other splitting ratios in various embodiments. Previously filed and now issued U.S. Pat. No. 10,731,988, titled "System Architecture for Integrated Photonics Optical Gyroscopes", which is incorporated herein for reference in its entirety, elaborates many of the waveguide based optical structures shown in FIGS. 9A-9B.

Referring to FIG. 9A, the portion of the signal split off from the interferometer at splitters 902A-B may be routed to optical couplers 907 (e.g., edge couplers or grating couplers) and measured using external detectors. Other couplers depicted in FIGS. 9A-B (on the input side or the output side) may connect to other external components such as a laser source or rotation sensing coil. Forward signals 908A-B may be used to monitor the counter-propagating beams immediately after interferometric splitter 904 and return signals 910A-B may be used to monitor the counter-propagating beams after passing through phase modulators 906A-B and the sensing coil. Referring to FIG. 9B, the split-off signal may similarly be routed to on-chip detectors such as the various types of photodetectors described herein. Forward detectors 912A-B may measure forward signals 908A-B described with respect to FIG. 9A and return detectors 914A-B may measure return signals 910A-B described with respect to FIG. 9A. Other placements of splitters 902A-B may allow monitoring of the forward and return signals before or after other elements of the interferometer in various embodiments.

Detectors (e.g., detectors 914A-B or external detectors monitoring signals 910A-B) may monitor the two counter-propagating beams in isolation prior to recombination to determine, e.g., individual amplitudes or other characteristics of each beam. The signals from the detectors may be provided to lock-in amplifiers (not depicted in FIGS. 9A-B) along with the modulation signal(s) for phase modulators 906A-B as reference signals to filter and amplify the monitoring signals (analogous to the configuration of lock-in amplifier 510 described with respect to FIG. 5). In at least one embodiment, the monitoring signals of the two counter-propagating beams in isolation may be processed along with the output of Sagnac detector 916 (e.g., corresponding to detector 502 of FIG. 5) using software, hardware, or a combination thereof to normalize bias instabilities in the rotation signal associated with differences in the two counter-propagating signals (e.g., differences in amplitude modulation). In at least one embodiment, the monitoring signals of the two counter-propagating beams in isolation may be inputs to a feedback loop, which may include additional hardware or software components. The output of the feedback loop may induce adjustments to the modulation signal (s) driving phase modulators 906A-B to mitigate bias instabilities and maintain a zero bias when there is no rotation.

In at least one embodiment, one or more additional splitters may be present to provide additional monitoring points for other purposes. For example, splitter 918 splits the interferometric signal off to Sagnac detector 916 in FIGS. 9A-B and may also provide a forward monitoring point for the beam provided by the off-chip laser source. In at least one embodiment, Sagnac detector 916 may be attached to interferometric splitter 904.

In at least one embodiment, a tapless approach may substitute for splitters 902A-B. For example, a portion of the waveguide (e.g., between interferometric splitter 904 and phase modulators 906A-B) may be doped to measure power changes associated with the photoconductive effect. Other methods and devices or combinations thereof may be used to monitor the two counter-propagating beams in isolation in various embodiments.

One or more of the normalization operations may be performed by one or more control ICs (e.g., control ICs 106 of FIG. 1). For example, the monitoring signals for the two counter-propagating beams may be routed to one or more control ICs to determine differences in the signals due to non-reciprocal sources of bias instabilities. The output of Sagnac detector 916 may further be routed to the one or more control ICs and modified based on the determined difference to normalize the rotation signal. In another example, the monitoring signals for the two counter-propagating beams may be routed to one or more control ICs that implemented the feedback loop (e.g., in hardware or software). The output of the feedback loop may drive reciprocal phase modulators 906A-B directly or may be routed to signal generators (e.g., within the control ICs) to generate the modulation frequencies. The control ICs may comprise a processor, microcontroller FPGA, PLD, ASIC, DSP, other analog or digital components, or a combination of components performing these operations to remove bias instability in the rotation signal. Control ICs may perform additional signal processing procedures and may provide the post-processed rotation signal at a communications interface of optical gyroscope 600 (e.g., UART, I2C, CAN bus, etc.).

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense. Additionally, the directional terms, e.g., "top", "bottom" etc. do not restrict the scope of the disclosure to any fixed orientation, but encompasses various permutations and combinations of orientations.

What is claimed is:

1. An optical gyroscope comprising:
    a first photodetector to measure a first signal associated with a first beam in isolation;
    a second photodetector to measure a second signal associated with a second beam in isolation, wherein the first beam and the second beam are counter-propagating with respect to each other;
    a third photodetector to measure a rotation signal associated with an interferometric combination of the first beam and the second beam;
    one or more control integrated circuits (ICs) to remove one or more bias instabilities from the rotation signal using the first signal and the second signal, wherein the one or more control IC generates a secondary modulation frequency that introduces a secondary bias with minimal sensitivity to rotation; and
    a waveguide coil with a plurality of turns acting as a rotation sensing element.

2. The optical gyroscope of claim 1, further comprising an optical splitter to split a portion of the first beam for routing to the first photodetector.

3. The optical gyroscope of claim 1, wherein the first photodetector comprises a doped portion of a waveguide associated with the first beam to measure an amplitude of the first beam using a photoconductive effect.

4. The optical gyroscope of claim 1, wherein removing the one or more bias instabilities from the rotation signal using the first signal and the second signal further comprises:
    determining a difference between the first signal and the second signal, wherein the determined difference between the first signal and the second signal is associated with the one or more bias instabilities; and
    modifying the rotation signal in view of the determined difference between the first signal and the second signal.

5. The optical gyroscope of claim 1, wherein removing the one or more bias instabilities from the rotation signal using the first signal and the second signal further comprises:
    providing the first signal and the second signal as inputs to a feedback loop; and
    modifying a driving frequency of one or more phase modulators using an output of the feedback loop.

6. The optical gyroscope of claim 5, wherein the one or more phase modulators are reciprocal phase modulators.

7. The optical gyroscope of claim 1, wherein the first photodetector, the second photodetector, and the third photodetector are part of an integrated photonics chip, the integrated photonics chip further comprising:
    one or more phase modulators; and
    an interferometric splitter.

8. The optical gyroscope of claim 7, wherein the one or more control integrated circuits (ICs) and the integrated photonics chip are co-packaged on a printed circuit board.

9. The optical gyroscope of claim 8, wherein the printed circuit board comprises one or more accelerometers forming part of an inertial measurement unit.

10. The optical gyroscope of claim 1, wherein the waveguide coil is fabricated on a silicon nitride chip.

* * * * *